US011701732B2

(12) United States Patent
Popp et al.

(10) Patent No.: US 11,701,732 B2
(45) Date of Patent: Jul. 18, 2023

(54) WELDING GUN AND WELDING METHOD

(71) Applicant: HILTI AKTIENGESELLSCHAFT, Schaan (LI)

(72) Inventors: Uwe Popp, Widnau (CH); Klaus Bertsch, Frastanz (AT)

(73) Assignee: HILTI AKTIENGESELLSCHAFT, Schaan (LI)

( * ) Notice: Subject to any disclaimer, the term of this patent is extended or adjusted under 35 U.S.C. 154(b) by 492 days.

(21) Appl. No.: 16/757,916

(22) PCT Filed: Nov. 21, 2018

(86) PCT No.: PCT/EP2018/082102
§ 371 (c)(1),
(2) Date: Apr. 21, 2020

(87) PCT Pub. No.: WO2019/120842
PCT Pub. Date: Jun. 27, 2019

(65) Prior Publication Data
US 2020/0338660 A1    Oct. 29, 2020

(30) Foreign Application Priority Data
Dec. 20, 2017  (EP) ..................................... 17208713

(51) Int. Cl.
*B23K 9/20*    (2006.01)
*B23K 9/28*    (2006.01)
*B23K 9/32*    (2006.01)

(52) U.S. Cl.
CPC ............. *B23K 9/202* (2013.01); *B23K 9/205* (2013.01); *B23K 9/287* (2013.01); *B23K 9/325* (2013.01)

(58) Field of Classification Search
CPC ........ B23K 9/325; B23K 9/287; B23K 9/205; B23K 9/202; B23K 9/20
See application file for complete search history.

(56) References Cited

U.S. PATENT DOCUMENTS 3,312,315 A * 4/1967 Graham ................. B23K 9/202
                                                    188/164
4,594,495 A * 6/1986 Glorioso ............... B23K 9/205
                                                     219/98
(Continued)

FOREIGN PATENT DOCUMENTS

CN    2130634 Y    4/1993
DE    906963 C     3/1954
(Continued)

OTHER PUBLICATIONS

International Bureau, International Search Report in International Application No. PCT/EP2018/082102, dated Feb. 25, 2019.

*Primary Examiner* — Brian W Jennison
(74) *Attorney, Agent, or Firm* — Leydig, Voit & Mayer, Ltd.

(57) ABSTRACT

A welding gun for welding a welding stud to a substrate in a welding direction is provided, comprising a holding device for holding the welding stud during a welding operation, wherein the welding stud has a contact surface which is intended to contact the substrate before and/or during the welding operation, further comprising a stud lifting device for conveying the holding device against the welding direction to an immersing start position, further comprising a stud immersing device for conveying the holding device from the immersing start position in the welding direction, further comprising a bearing element having a bearing surface for supporting the welding gun on the substrate, and further comprising a device for automatically adapting the immersing start position relative to the bearing surface in the welding direction.

20 Claims, 3 Drawing Sheets

(56) References Cited

U.S. PATENT DOCUMENTS

| | | | |
|---|---|---|---|
| 5,662,820 A * | 9/1997 | Schwiete | B23K 9/202 |
| | | | 219/98 |
| 6,297,472 B1 | 10/2001 | Bong et al. | |
| 6,337,457 B1 * | 1/2002 | Runzheimer | B23K 9/202 |
| | | | 219/98 |
| 2001/0045420 A1 | 11/2001 | Bong et al. | |
| 2007/0295699 A1 * | 12/2007 | Ulrich | B23K 9/202 |
| | | | 219/98 |
| 2014/0025196 A1 * | 1/2014 | Hain | G05B 19/402 |
| | | | 700/192 |

FOREIGN PATENT DOCUMENTS

| | | |
|---|---|---|
| DE | 3606613 C1 | 6/1987 |
| DE | 202013104503 U1 | 1/2015 |
| FR | 2915911 A1 | 11/2008 |
| JP | 2004-276104 A | 10/2004 |
| TW | 434083 B | 5/2001 |

* cited by examiner

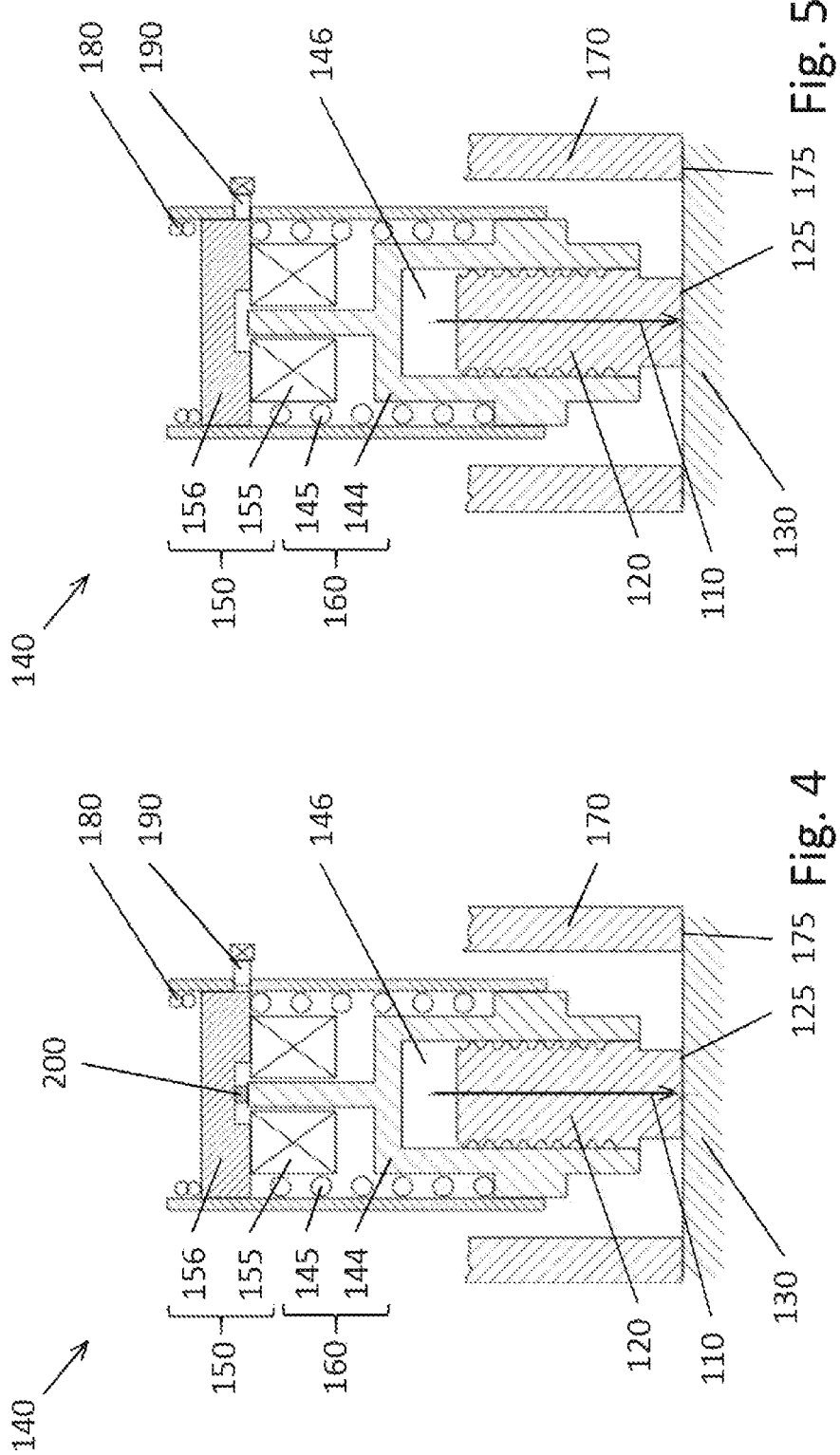

WELDING GUN AND WELDING METHOD

CROSS-REFERENCE TO RELATED APPLICATIONS

This patent application is the U.S. National Stage of International Patent Application No. PCT/EP2018/082102, filed Nov. 21, 2018, which claims the benefit of European Patent Application No. 17208713.2, filed Dec. 20, 2017, which are each incorporated by reference.

TECHNICAL FIELD

The invention relates generally to a device and to a method for fastening a stud to a substrate and also to such a stud.

BACKGROUND OF THE INVENTION

There are numerous known devices and methods by which various studs are fastened to a substrate in different applications. For example, a stud is brought into contact with the substrate and an electric current is applied to it. For this purpose, the stud is held by an electrically conductive stud holder.

As soon as the electric current flows between the stud and the substrate, the stud is lifted off the substrate to form an arc. The energy that is released causes the material of the stud and the substrate to be partially liquefied. The electric current is then switched off and the stud is immersed in the liquefied material while this material cools down and becomes solid. The stud is then connected to the substrate in an integrally bonded manner.

In order to provide the necessary energy for liquefying the material of the stud and the substrate in a sufficiently short time, there are known devices that generate an electric current of a very high intensity and use a correspondingly rated electric cable to feed it to the stud. To avoid oxidizing of the liquefied material, it is known to surround the area of contact between the stud and the substrate with an inert gas.

In the case of applications in building construction or shipbuilding for example, threaded studs of various sizes to which an item is screwed are used in order to fasten the item to the substrate. Some parameters of the fastening method, such as for example the duration and electrical power of the electric current, are to be set by a user on the device and are to be adapted to the stud that is used. The user finally assesses the quality of the connection between the stud and the substrate by means of a visual inspection. The quality of the connection consequently also depends on the experience and capabilities of the user.

BRIEF SUMMARY OF THE INVENTION

The object of the invention is to provide a device and/or a method with which fastening of a stud to a substrate is made easier and/or improved.

This object is achieved in a welding gun for welding a welding stud in a welding direction to a substrate, comprising a holding device for holding the welding stud during a welding operation, wherein the welding stud has a contact surface which is intended to contact the substrate before and/or during the welding operation, further comprising a stud lifting device for conveying the holding device against the welding direction to an immersing start position, further comprising a stud immersing device for conveying the holding device from the immersing start position in the welding direction, further comprising a bearing element having a bearing surface for supporting the welding gun on the substrate, and further comprising a device for preferably automatically adapting the immersing start position relative to the bearing surface in the welding direction. The immersing start position does not depend, as in the case of known welding guns, on a position of the bearing element in the welding direction but on a position of the contact surface. As a result, the desired immersing start position is ensured even for nonplanar substrates, for example for substrates with curvatures, depressions, dirt or previously removed surface layers. The device is preferably provided for automatically adapting the immersing start position in order to move the stud lifting device relative to the bearing surface in the welding direction, that is to say for automatically adapting a distance in the welding direction between the stud lifting device and the bearing surface.

An advantageous embodiment is characterized in that the welding gun comprises a locking element for locking the stud lifting device in two or more different positions relative to the bearing surface.

An advantageous embodiment is characterized in that the welding gun comprises a driving element which is movable between a driving position and a release position, wherein the driving element in the driving position transmits a movement of the holding device against the welding direction to the stud lifting device, and wherein the driving element in the release position enables a movement of the holding device against the welding direction relative to the stud lifting device.

An advantageous embodiment is characterized in that the welding gun comprises a holding spring which urges the holding device relative to the stud lifting device in the welding direction. A further advantageous embodiment is characterized in that the welding gun comprises a driving spring which urges the stud lifting device relative to the bearing element in the welding direction. A spring constant of the driving spring is preferably greater than a spring constant of the holding spring.

An advantageous embodiment is characterized in that the stud lifting device is suitable for moving the driving element from the driving position into the release position when the holding device is conveyed to the immersing start position.

The object is also achieved in a method for using such a welding gun, in which the welding stud is held on the holding device, the welding gun with the welding stud is placed on the substrate until the contact surface contacts the substrate, the welding gun is pressed onto the substrate until the holding device bears against the driving element, with the holding spring preferably being tensioned here, the welding gun is pressed further onto the substrate until the bearing surface bears against the substrate, with the driving spring preferably being tensioned here, the stud lifting device is locked, the driving element is moved, preferably by the stud lifting device, into the release position, and the holding device is conveyed against the welding direction to the immersing start position and from the immersing start position in the welding direction.

BRIEF DESCRIPTION OF THE SEVERAL VIEWS OF THE DRAWING(S)

The invention will be explained in more detail below on the basis of exemplary embodiments with reference to the drawings. In the drawings:

FIG. 1 schematically shows a welding device,

FIG. 4 shows the welding gun from FIGS. 2 to 3 in a partial longitudinal sectional view, and FIG. 5 shows the welding gun from FIGS. 2 to 4 in a partial longitudinal sectional view.

DETAILED DESCRIPTION OF THE INVENTION

Figure 1:
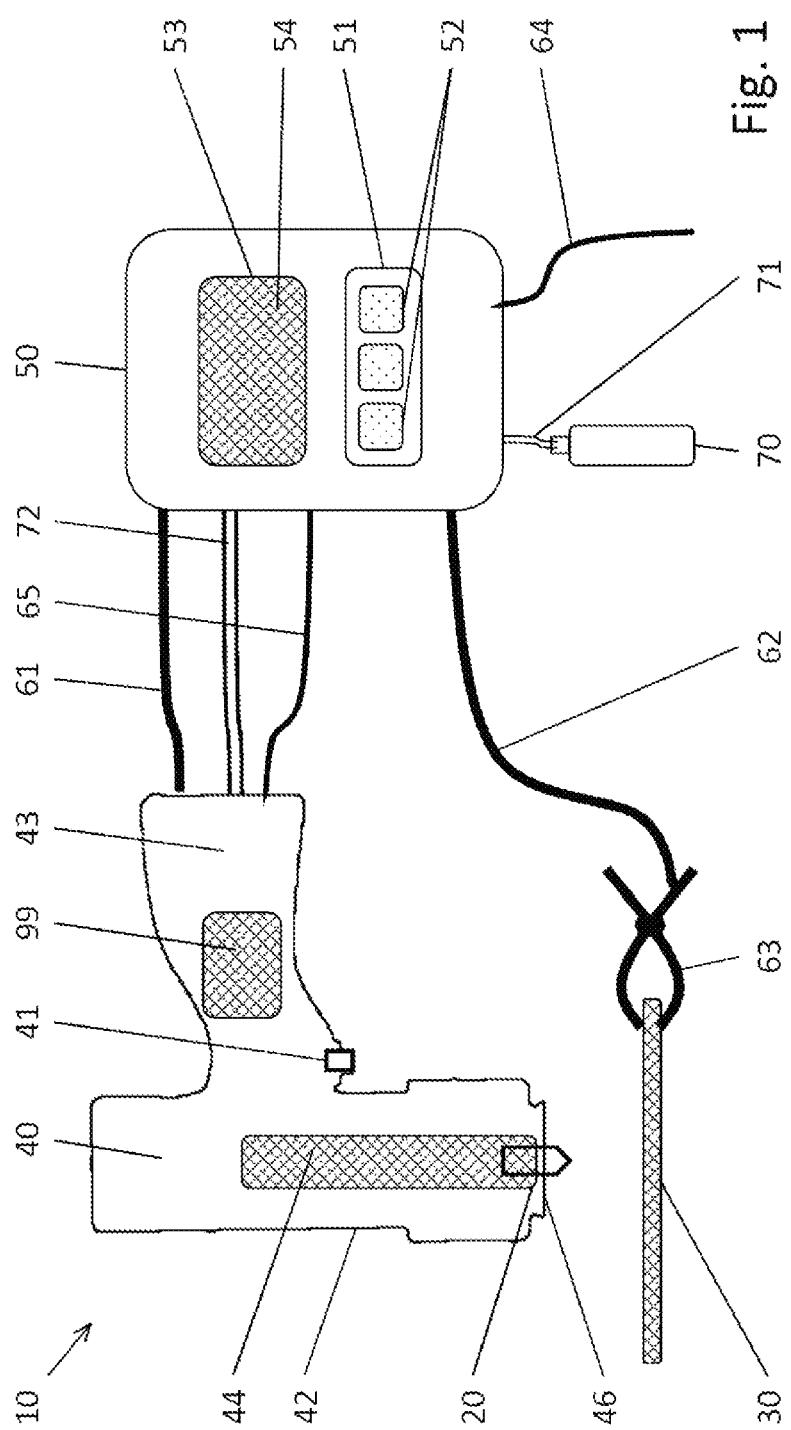

In FIG. 1, a welding device 10 for welding a welding stud 20 to a substrate 30 is schematically represented. A material of the welding stud 20 and a material of the substrate 30 are electrically conductive, in particular metallic. The welding device 10 comprises a welding gun 40 with a trigger switch 41, formed as a pushbutton switch, a welding unit 50, a first electric cable 61, a second electric cable 62 with a connection terminal 63, an electric supply cable 64, formed for example as a power cable, an electrical communication line 65, a gas reservoir 70, formed as a gas cylinder, a tubular gas supply line 71 and a gas hose 72.

The first cable 61 serves for supplying the welding stud 20 with electric current through the welding unit 50. The second cable 62 serves for electrically connecting the substrate 30 to the welding unit 50 when the connection terminal 63 is clamped to the substrate 30. When the welding stud 20 comes into contact with the substrate 30, a circuit closes, so that welding current, for example in the form of direct current or alternating current, can be applied to the welding stud 20 by the welding unit 50. For this purpose, the welding gun 40 comprises a welding-current contact element that is not shown in FIG. 1. The welding unit 50 comprises a device that is not shown for converting electric current from the supply cable 64 into welding current, which comprises for example an electrical capacitor, a thyristor, a bipolar transistor with an isolated gate electrode or other components from power electronics and also an associated control unit with a microprocessor, in order to provide the welding current at the desired voltage and current intensity.

The gas supply line 71 and the gas hose 72 serve for supplying a contact region between the welding stud 20 and the substrate 30 with an inert gas from the gas reservoir 70, in order to protect the contact region from oxidation due to oxygen from a surrounding area during a welding operation. For controlling a gas flow to the contact region, the gas reservoir 70, the gas supply line 71, the welding unit 50, the gas hose 72 or the welding gun 40 comprises a valve, in particular a controllable valve, that is not shown.

The welding unit 50 has an input device 51 with actuating elements 52 and also an output device 53 with a visual display element 54 and a wireless transmission unit. The input device 51 serves for inputting parameters of a welding method to be carried out with the welding device 10, such as for example the electrical voltage, current intensity, power and time duration of the welding current, position and speed of the stud and so on, by a user of the welding device 10. The output device 53 serves for outputting information to the user, such as for example information on parameters of the welding method, information on detected emissions of the welding method or other variables, information on a quality of the welding operation, information on measures for improving the welding operation, information on detected characteristics of the welding stud or information derived from the aforementioned variables, and/or recommendations or instructions for cleaning and/or maintaining the welding device 10, in particular the welding gun 40.

The communication line 65 serves for communication between the welding gun 40, in particular a control device of the welding gun 40 that is not shown in FIG. 1, and the welding unit 50, in particular the control unit and/or the input device 51 and/or the output device 53. By means of this communication, for example, an exchange of information about the parameters of a welding operation is accomplished, in order for example to achieve or facilitate a synchronization of the welding current with a movement of the welding stud 20. In the case of exemplary embodiments that are not shown, the communication between the welding gun and the welding unit takes place wirelessly, by radio or by means of the first electric cable, which carries the welding current.

The welding gun 40 has a housing 42 with an opening 46, from which housing a handle 43 with the trigger switch 41 protrudes. The welding gun 40 also has a stud holder 44, on which the welding stud 20 is held during a welding operation. For this purpose, the stud holder comprises for example two, three, four or more resilient arms that are not shown in detail, between which the welding stud 20 is inserted and held by means of a clamping fit. The welding gun 40 also has, for applying a welding current to the welding stud 20, a welding-current contact element which is integrated in the stud holder 44, for example in the form of one or more of the resilient arms.

The welding gun 40 also has a control device 99 for controlling the various components and devices of the welding gun and of the welding unit 50. The control device 99 is intended for controlling one or more parameters of the welding operation. For this purpose, the control device 99 comprises various electronic components, such as for example one or more microprocessors, one or more temporary or permanent data memories, and the like.

The welding gun 40 also has a stud lifting device, which is formed as a first lifting magnet, which acts on the stud holder 44 with a force away from the opening 46 to the rear (upwardly in FIG. 1) when the stud lifting device is activated. Via a signal line that is not shown, the control device 99 communicates with the stud lifting device in order to control the stud lifting device, in particular to activate and deactivate it.

The welding gun 40 also has a stud immersing device, formed as a spring element or as a second lifting magnet, which acts on the stud holder 44 forwardly with a force toward the opening 46 (downwardly in FIG. 1) when the stud immersing device is activated. Via a signal line that is not shown, the control device 99 communicates with the stud immersing device in order to control the stud immersing device, in particular to activate and deactivate it. If the stud immersing device takes the form of a spring element, this spring element is preferably tensioned when the stud holder is moved by the stud lifting device to the rear, with the result that the spring element moves the stud holder forward as soon as the stud lifting device is deactivated.

In a welding method with the welding device 10, at first the substrate 30 and the stud 20 are provided. In a further step, information, for example about desired parameters of the following welding operation, are input by a user via the input device. In a further step, a welding current between the welding stud 20 and the substrate 30 is applied to the welding stud 20 by the welding unit 50 by means of the first cable 61 and the second cable 62. In a further step, the welding stud 20 is lifted off the substrate by means of the stud lifting device while maintaining the welding current flowing between the welding stud 20 and the substrate 30, with an arc being formed between the welding stud 20 and the substrate 30. Particularly on account of the heat generated by the arc, a material of the welding stud 20 and/or of the substrate 30 is then partially liquefied. In a further step, the welding stud 20 is immersed by means of the stud immersing device in the liquefied material of the welding stud 20 or of the substrate 30. The liquefied material of the welding stud 20 or of the substrate 30 then solidifies such that the welding stud 20 is connected to the substrate 30 in an integrally bonded manner.

FIGS. 2 to 5 illustrate a welding gun 140 for welding a welding stud 120 having a contact surface 125 in a welding direction 110 to a substrate 130, in a longitudinal section. The welding gun 140 comprises a holding device 144, in the form of a stud holder, for holding the welding stud 120 during a welding operation. For this purpose, the holding device 144 has a stud receptacle 146. The welding gun further comprises a stud lifting device 150 for conveying the holding device 144 against the welding direction 110 to an immersing start position, wherein the stud lifting device 150 comprises a lifting magnet 155 and a carrier 156, wherein the lifting magnet 155 is fastened to the carrier 156.

The welding gun 140 comprises a stud immersing device 160 for conveying the holding device 144 from the immersing start position in the welding direction 110. The stud immersing device 160 comprises a holding spring 145, which urges the holding device 144 relative to the stud lifting device 150 in the welding direction 110, and the holding device 144. The welding gun 140 further comprises a bearing element 170 having a bearing surface 175 for supporting the welding gun 140 on the substrate 130. The welding gun 140 also comprises a driving spring 180 which urges the stud lifting device 150 relative to the bearing element 170 in the welding direction 110 and whose spring constant is greater than a spring constant of the holding spring 145.

The welding gun 140 further comprises a device, which is not provided with reference sign, for automatically adapting the immersing start position relative to the bearing surface 175 in the welding direction 110. This adapting device comprises the holding device 144, the carrier 156, the driving spring 180, a locking element 190 for locking the stud lifting device 150 in two or more different positions relative to the bearing surface 175, and a driving element 200. The driving element 200 is movable between a driving position shown in FIGS. 2 to 4 and a release position as per FIG. 5.

Figure 2:
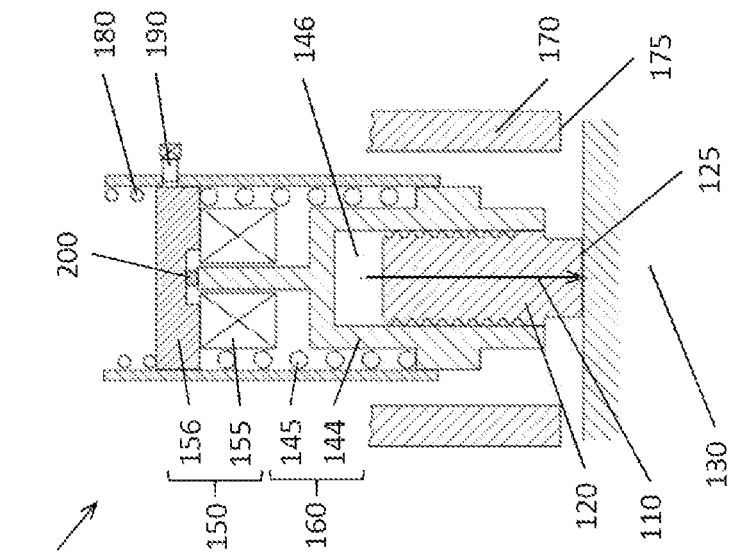
FIG. 2 shows a welding gun in a partial longitudinal sectional view.
Figure 3:
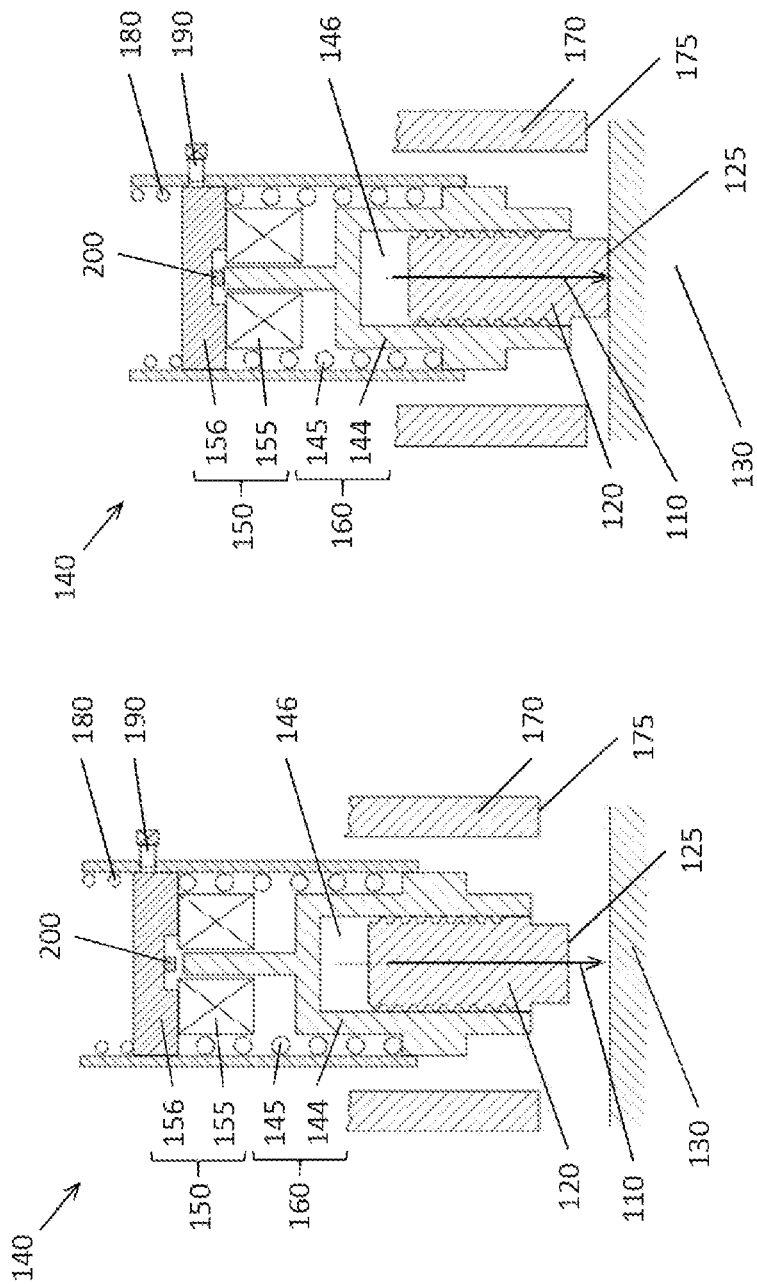
FIG. 3 shows the welding gun from FIG. 2 in a partial longitudinal sectional view.

The welding gun 140 is to be used as follows. First of all, the welding stud 120 is held on the holding device 144 by being received in the stud receptacle 146, for example by being plugged in (FIG. 2). The welding gun 140 with the welding stud 120 is then placed on the substrate 130 such that the contact surface 125 contacts the substrate. The welding gun 140 is then pressed in the welding direction 110 onto the substrate 130 until the holding device 144 bears against the driving element 200 (FIG. 3). The holding spring 145 is tensioned here. The welding gun 140 is then pressed further onto the substrate 130 until the bearing surface 175 bears against the substrate 130 (FIG. 4). The driving spring 200 is tensioned here, and the stud lifting device 150 with the carrier 156 is displaced with respect to the bearing element 170 against the welding direction 110 by virtue of the driving element 200 in the driving position transmitting the movement of the holding device 144 against the welding direction 110 to the stud lifting device 150. The stud lifting device 150 with the carrier 156 is then locked by means of the locking element 190, and the driving element 200 is moved into the release position (FIG. 5) in which it is arranged outside the drawing plane such that it cannot be seen in FIG. 5. Here, the locking element 190 locks the carrier 156 by means of a frictional engagement. In exemplary embodiments that are not shown, the locking element locks the stud lifting device by means of a form fit and for this purpose is displaced linearly and/or pivoted.

The welding gun 140 is now ready for a welding operation during which the holding device 144 is conveyed by the stud lifting device 150 against the welding direction 110 to the immersing start position and by the stud immersing device 160 from the immersing start position in the welding direction 110. For this purpose, the driving element 200 in the release position enables the movement of the holding device 144 against the welding direction 110 relative to the stud lifting device 150. The driving element 200 is preferably moved by the stud lifting device 150, preferably the lifting magnet 155, from the driving position into the release position by the lifting magnet 155 for conveying the holding device 144 to the immersing start position being activated. The driving element 200 is then preferably spring-loaded toward the driving position. The driving element 200 is moved linearly from the driving position to the release position. In exemplary embodiments that are not shown, the driving element is pivoted from the driving position to the release position. In further exemplary embodiments that are not shown, the driving element and the locking element are moved by a common actuator. In further exemplary embodiments that are not shown, the driving element, the locking element and the holding device are moved by a common actuator or by three mutually independent actuators.

The immersing start position now depends on a position of the contact surface 125 and is predetermined only by a lift of the lifting magnet 155. This ensures the desired immersing start position even in the case of nonplanar substrates and is not influenced by a difference in position between the bearing surface 175 and the contact surface 125 in the welding direction 110.

The holding device 144 of the welding gun 140 preferably also serves as a welding-current contact element, so that a stable welding current is ensured. In addition, under certain circumstances wear of the holding device 144 is reduced.

The invention has been described on the basis of examples of a welding gun and a method for the use thereof. The features of the described embodiments can also be combined as desired with one another within a single welding gun or a single welding method. It is pointed out that the device according to the invention and the method according to the invention are also suitable for other purposes.

The invention claimed is:

1. A welding gun for welding a welding stud to a substrate in a welding direction, the welding gun comprising a holding device for holding the welding stud during a welding operation, wherein the welding stud has a contact surface which is intended to contact the substrate before and/or during the welding operation; a stud lifting device for conveying the holding device against the welding direction to an immersing start position; a stud immersing device for conveying the holding device from the immersing start position in the welding direction; a bearing element having a bearing surface for supporting the welding gun on the substrate; a locking element configured to lock the stud lifting device in an offset position relative to the bearing surface; and, a device configured to offset the immersing start position relative to the bearing surface in the welding direction.

2. The welding gun as claimed in claim 1, wherein the device configured to offset the immersing start position is provided for moving the stud lifting device relative to the bearing surface in the welding direction.

3. The welding gun as claimed in claim 1, wherein the locking element is configured to lock the stud lifting device in two or more different positions relative to the bearing surface.

4. The welding gun as claimed in claim 1, wherein the welding gun comprises a driving element which is movable between a driving position and a release position, wherein the driving element in the driving position transmits a movement of the holding device against the welding direction to the stud lifting device, and wherein the driving element in the release position enables a movement of the holding device against the welding direction relative to the stud lifting device.

5. The welding gun as claimed in claim 1, wherein the welding gun comprises a holding spring which urges the holding device relative to the stud lifting device in the welding direction.

6. The welding gun as claimed in claim 1, wherein the welding gun comprises a driving spring which urges the stud lifting device relative to the bearing element in the welding direction.

7. The welding gun as claimed in claim 5, wherein a spring constant of the driving spring is greater than a spring constant of the holding spring.

8. The welding gun as claimed in claim 1, wherein the stud lifting device is suitable for moving the driving element from a driving position into a release position when the holding device is conveyed to the immersing start position.

9. A method for using a welding gun as claimed in claim 4, comprising:
   a) holding the welding stud on the holding device,
   b) placing the welding gun with the welding stud on the substrate until the contact surface of the welding stud contacts the substrate,
   c) pressing the welding gun onto the substrate until the holding device bears against the driving element,
   d) further pressing the welding gun onto the substrate until the bearing surface bears against the substrate,
   e) locking the stud lifting device,
   f) moving the driving element into the release position,
   g) conveying the holding device against the welding direction to the immersing start position, and
   h) conveying the holding device from the immersing start position in the welding direction.

10. The method as claimed in claim 9, wherein the holding spring is tensioned during c).

11. The method as claimed in claim 9, wherein the driving spring is tensioned during d).

12. The method as claimed in claim 9, wherein the driving element is moved by the stud lifting device during f).

13. The welding gun as claimed in claim 2, wherein the locking element is configured to lock the stud lifting device in two or more different positions relative to the bearing surface.

14. The welding gun as claimed in claim 2, wherein the welding gun comprises a driving element which is movable between a driving position and a release position, wherein the driving element in the driving position transmits a movement of the holding device against the welding direction to the stud lifting device, and wherein the driving element in the release position enables a movement of the holding device against the welding direction relative to the stud lifting device.

15. The welding gun as claimed in claim 2, wherein the welding gun comprises a holding spring which urges the holding device relative to the stud lifting device in the welding direction.

16. The welding gun as claimed in claim 2, wherein the welding gun comprises a driving spring which urges the stud lifting device relative to the bearing element in the welding direction.

17. The welding gun as claimed in claim 6, wherein a spring constant of the driving spring is greater than a spring constant of the holding spring.

18. The method as claimed in claim 10, wherein the driving spring is tensioned during d).

19. The method as claimed in claim 10, wherein the driving element is moved by the stud lifting device during f).

20. The method as claimed in claim 11, wherein the driving element is moved by the stud lifting device during f).

* * * * *